United States Patent
Herrero (10) Patent No.: US 10,263,913 B2
(45) Date of Patent: Apr. 16, 2019

(54) TUNNEL CONSOLIDATION FOR REAL-TIME COMMUNICATIONS

(71) Applicant: Oracle International Corporation, Redwood Shores, CA (US)

(72) Inventor: Rolando Herrero, Derry, NH (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 27 days.

(21) Appl. No.: 14/681,418

(22) Filed: Apr. 8, 2015

(65) Prior Publication Data

US 2016/0301626 A1 Oct. 13, 2016

(51) Int. Cl.
*H04L 12/911* (2013.01)
*H04L 12/46* (2006.01)

(52) U.S. Cl.
CPC ........ *H04L 47/825* (2013.01); *H04L 12/4633* (2013.01)

(58) Field of Classification Search
CPC ......... H04L 12/28; H04L 29/06; H04L 45/02; H04L 63/04; H04L 12/26; H04L 12/4633; H04L 12/911; H04L 29/12; H04L 47/825; H04L 65/608; H04L 61/2007; H04W 72/02; H04W 72/06; H04W 12/02; H04M 1/66
See application file for complete search history.

(56) References Cited

U.S. PATENT DOCUMENTS

| | | | | |
|---|---|---|---|---|
| 2003/0076825 | A1* | 4/2003 | Guruprasad | H04L 45/02 370/389 |
| 2009/0170475 | A1* | 7/2009 | Ch'ng | H04W 12/02 455/411 |
| 2010/0039935 | A1* | 2/2010 | Davison | H04L 12/4633 370/228 |
| 2013/0059614 | A1* | 3/2013 | Kannan | H04W 72/06 455/500 |
| 2013/0283037 | A1* | 10/2013 | Katz | H04L 63/04 713/151 |

OTHER PUBLICATIONS

Oracle Communications; Oracle Data Sheet; "Acme Packet 4500"; http://www.oracle.com/us/industries/communications/acme-packet-4500-ds-1990148.pdf, last downloaded Oct. 20, 2014.
3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

*Primary Examiner* — Zhiren Qin
(74) *Attorney, Agent, or Firm* — Potomac Law Group, PLLC (57) ABSTRACT

A system performs tunneling for real-time communications ("RTC"). The system determines a quantity of available tunnels at a tunneling server. The system then determines that the quantity of available tunnels is below a threshold, and that two or more tunnels established with the tunneling server correspond to a user equipment ("UE"). The system indicates to the UE to consolidate the two or more tunnels into a target tunnel within the two or more tunnels, and performs the RTC with the UE over the target tunnel.

20 Claims, 4 Drawing Sheets

TUNNEL CONSOLIDATION FOR REAL-TIME COMMUNICATIONS

FIELD

One embodiment is directed generally to a communications network, and in particular, to delivering real-time traffic over a communications network.

BACKGROUND INFORMATION

Many enterprises have moved from telephony services using the Public Switched Telephone Network ("PSTN") (provided by a traditional telephone company) to telephony services using the Internet Protocol ("IP") (provided by an IP Telephony service provider). Such services are commonly known as Voice over IP ("VoIP") or IP Telephony. IP Telephony uses an IP network (e.g., the Internet) as a backbone and can thus provide advanced features such as video conferencing, call recording, and call forwarding.

Recently, driven by the growing base of mobile data subscribers, ubiquitous Internet access, and high bandwidth that is now available in both fixed and mobile networks, advanced services accessed via the Internet (known as Over-the-Top ("OTT") services) have become popular. However, while OTT services threaten traditional telephony offerings, innovative service providers are introducing their own OTT services, and must therefore overcome a number of unique challenges as they deploy and market these new services.

SUMMARY

One embodiment is a system that performs tunneling for real-time communications ("RTC"). The system determines a quantity of available tunnels at a tunneling server. The system then determines that the quantity of available tunnels is below a threshold, and that two or more tunnels established with the tunneling server correspond to a user equipment ("UE"). The system indicates to the UE to consolidate the two or more tunnels into a target tunnel within the two or more tunnels, and performs the RTC with the UE over the target tunnel.

DETAILED DESCRIPTION

One embodiment provides tunnel consolidation services for real-time communications ("RTC") in a network environment. In one embodiment, when the number of available/free tunnels at a tunneling server drops below a threshold, the tunneling server identifies clients that have occupied more than one tunnel and sends a message to those clients to consolidate their tunnels so more tunnels can become available at the tunneling server. Accordingly, embodiments make efficient use of tunnels at a tunneling server so that the tunneling server can provide tunneled RTC services to more clients.

Figure 1:
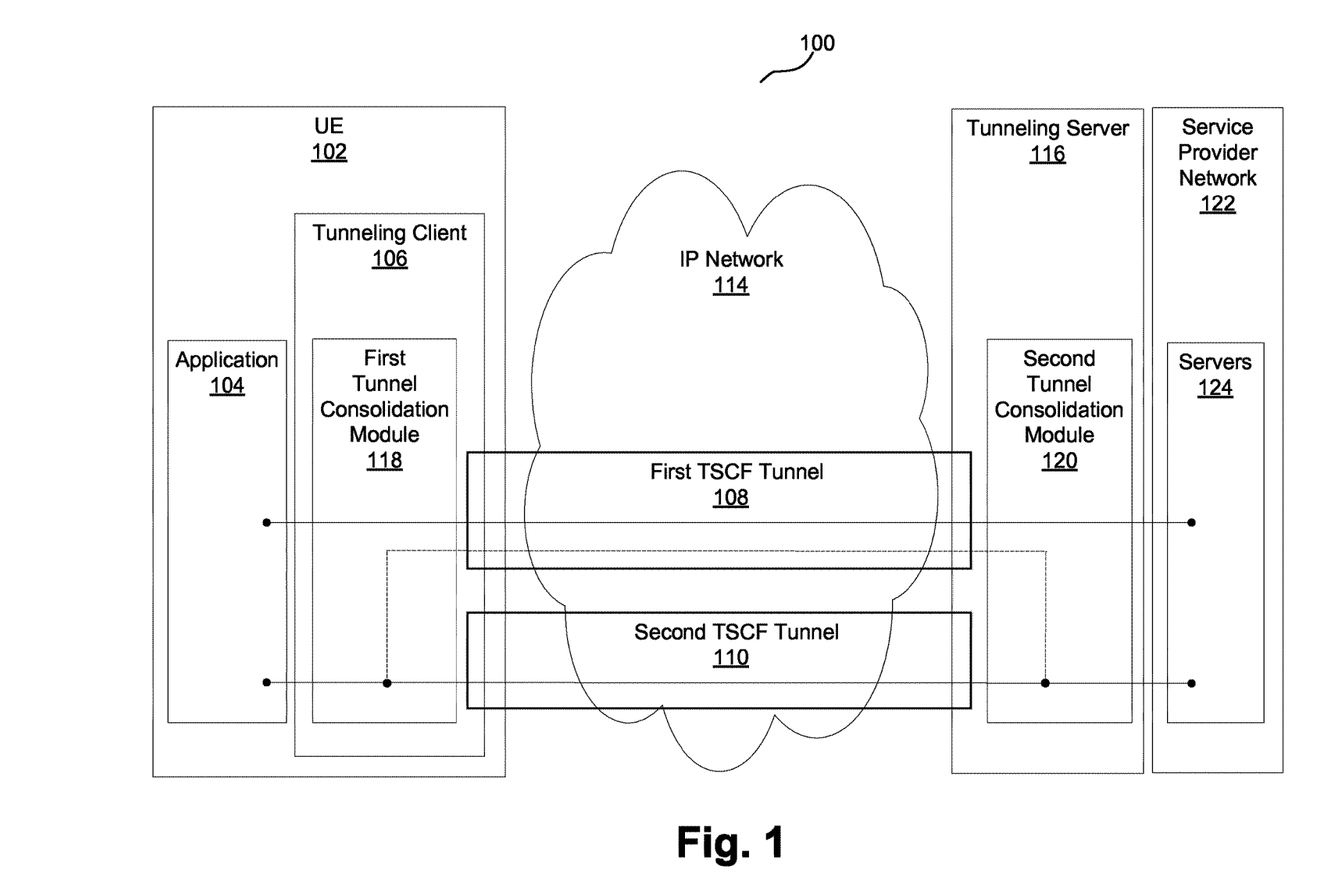
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network 122. RTC refers to a mode of communications in which users exchange information instantly or with negligible latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is a signaling communications protocol, conventionally used for controlling multimedia communication sessions such as voice and video calls over IP networks. SIP is configured to be independent of the underlying transport layer. Accordingly, SIP can run on different transport protocols, such as the Transmission Control Protocol ("TCP"), the User Datagram Protocol ("UDP"), etc.

TCP is one of the core protocols of the IP suite and provides reliable, ordered, and error-checked delivery of a stream of octets between programs running on computers connected to an IP network such as a local area network, an intranet, or the public Internet, as described in, for example, Internet Engineering Task Force ("IETF") request for comments ("RFC") 793 and RFC 675. A datagram is a basic transfer unit associated with a packet-switched network for which the delivery, arrival time, and order of arrival need not be guaranteed by the network. UDP is a protocol that uses a simple connectionless transmission model with a minimum of protocol mechanisms, as described in, for example, IETF RFC 768. Applications that do not require the reliability of a TCP connection may instead use UDP, which emphasizes low-overhead operation and reduced latency rather than error checking and delivery validation.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In general, using a tunnel for communications refers to using a delivery protocol to encapsulate a different payload protocol.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol configured to provide communications security over the Internet. TLS is an IETF standards track protocol as provided in, for example, IETF RFC 2246, RFC 4346, RFC 5246, and/or RFC 6176. DTLS is a protocol that provides communications privacy for datagram protocols. DTLS allows datagram-based applications to communicate in a way that prevents eavesdropping, tampering, or message forgery. DTLS is based on the stream-oriented TLS protocol and provides similar security guarantees. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage a corresponding TSCF tunnel so that UE 102 may use the TSCF tunnel to traverse such security devices and connect to tunneling server 116 to reach servers 124 in service provider network 122.

The TSCF standard further provides control messages for exchanging configuration information between client side and server side network elements that establish and manage tunnels for performing RTC (e.g., tunneling client 106 and tunneling server 116 in FIG. 1). According to the TSCF standard, control messages between client side and server side network elements are of a "request/response" type, and a control message response for a request includes either a corresponding reply or an error code indicating why the request could not be honored. TSCF control messages utilize a Type Length Value ("TLV") encoding. TLV is defined as the variable length concatenation of a unique Type (represented by an integer) and a Value containing the actual value identified by the Type.

Each TSCF control message includes a control message header at the beginning. Table 1 below provides an example TSCF control message header configuration.

TABLE 1

| Field Name | Value Type | Length |
| --- | --- | --- |
| CM_Version | Unsigned integer | 4 bits |
| CM_Indication | bits | 2 bits |
| Reserved | bits | 2 bits |
| CM_Type | Unsigned integer | 1 byte |
| TLV_Count | Unsigned integer | 2 bytes |
| Tunnel Session ID | Unsigned integer | 8 bytes |
| Sequence | Unsigned integer | 4 bytes |

An Example TSCF Control Message Header Configuration

In the header configuration of Table 1, the "CM_Version" field is the first nibble (i.e., 4 bits) of the first byte and identifies the version of the header. Currently version 1 is supported and versions 4 and 6 are reserved for IP payload differentiation (the first nibble of the first byte of IP header is the IP header version which is 4 for IPv4 and 6 for IPv6). The "CM_Version" field is required to indicate the outer transport protocol of a TSCF tunnel. The "CM_Indication" field identifies whether the message is a control message or not. This field must be set to 0 to indicate that a message is a control message. The "Reserved" field is reserved for future use and its bits are set to zero. The "CM_Type" field identifies the type of the control message, e.g., whether it is a request or a response, and the functionality it is used for. The "TLV Count" field indicates the number of TLVs that follow (or are appended to) the header in the current control message. The control message header itself is not a TLV and is not counted as one. The "Tunnel Session ID" ("TSID") field includes a tunnel session identifier ("ID") that is assigned by a server side network element to uniquely identify a TSCF tunnel. The "Sequence" field is an ever incrementing transaction counter so that each outstanding "request" message includes a unique value in this field.

In one embodiment, in order to establish a TSCF tunnel, tunnelling client 106 sends a "configuration request" message to tunnelling server 116 to obtain configuration information for a TSCF tunnel. Table 2 below provides an example "configuration request" message header.

TABLE 2

| Field Name | Value | Notes |
| --- | --- | --- |
| CM_Version | 1 | Current = 1 |
| CM_Indication | 0 | Must be set as 0 to indicate this is a control message |
| Reserved | 0 | Must be set as 0 |
| CM_Type | 1 | Indicates a "Configuration_Request" |
| TLV_Count | Variable | |
| Tunnel Session ID | FFF . . . | |

An Example "Configuration Request" Message Header

As provided in Table 2, in the "configuration request" message, all TSID header field bits are set to 1 (i.e., FFFF . . . ). In response, tunnelling server 116 assigns a TSID to a TSCF tunnel and sends a "configuration response" message back to tunnelling client 106. Table 3 below provides an example "configuration response" message header.

TABLE 3

| Field Name | Value | Notes |
| --- | --- | --- |
| CM_Version | 1 | Current = 1 |
| CM_Indication | 0 | Must be set as 0 to indicate this is a control message |
| Reserved | 0 | Must be set as 0 |
| CM_Type | 2 | Indicates a "Configuration_Response" |
| TLV_Count | Variable | |
| Tunnel Session ID | The TSID assigned by the tunnelling server | |

An Example "Configuration Response" Message Header

As provided in Table 3, the "configuration response" message includes the assigned TSID. All following messages between tunnelling client 106 and tunnelling server 116 include this assigned TSID in their headers.

In one embodiment, if a control message is communicated between tunnelling client 106 and tunnelling server 116 and does not include the expected TSID, the control message is dropped and the corresponding TSCF tunnel is terminated.

Alternatively, in one embodiment, tunnelling client 106 may send a "configuration release request" message to tunnelling server 116 to terminate a TSCF tunnel. In response to such a "configuration release request" message, tunnelling server 116 sends a "configuration release response" message to tunnelling client 106. At this time, the TSCF tunnel is terminated.

In one embodiment, UE 102 executes an application 104 that may be a SIP based RTC application relying on a library such as the software development kit ("SDK") provided by the tunneled session management solution from Oracle Corp.

Figure 2:
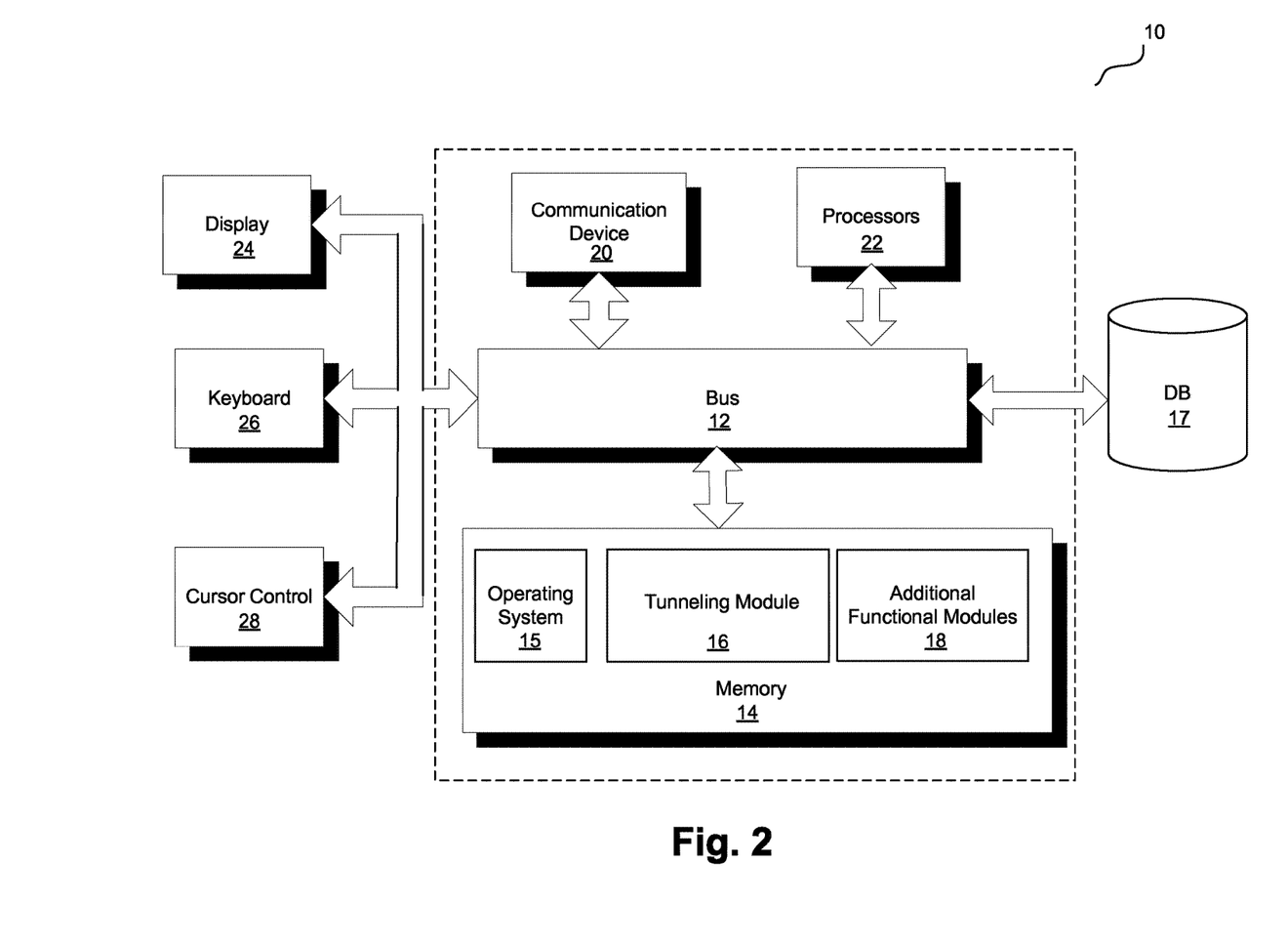
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a tunneling server, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a tunneling module 16 for providing tunneling, and all other functionality disclosed herein. In one example embodiment, tunneling module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for tunneling module 16 and additional functional modules 18.

In one embodiment, tunneling module 16 and/or additional functional modules 18 may include a determining module that determines a quantity of available tunnels at a tunneling server; the determining module further determining that the quantity of available tunnels is below a threshold; the determining module further determining that two or more tunnels established with the tunneling server correspond to a UE; an indicating module that indicates to the UE to consolidate the two or more tunnels into a target tunnel within the two or more tunnels; and a performing module that performs RTC with the UE over the target tunnel, as will be described herein with reference to FIG. 4.

Referring again to FIG. 1, with known systems, in order to maximize performance, many client applications create multiple tunnels with different transport protocols for signaling and media traffic. For example, since stream-based transport protocols provide reliability while datagram-based transport protocols minimize latency, application 104 may create a stream-based tunnel for signaling (e.g., using SIP) and a separate datagram-based tunnel for media traffic (e.g., using RTP).

One disadvantage with these known systems is that since tunnels are shared resources and tunneling server 116 can support a limited number of tunnels, the maximum number of clients/endpoints that can be simultaneously served by tunneling server 116 is reduced when multiple tunnels are created for each client, resulting in considerable loss of traffic. The resources of tunneling server 116 that are shared between the tunnels may include encryption resources, space tables/mapping resources, memory resources, computational resources, etc.

In contrast to the known systems, embodiments of the present invention provide efficient utilization of the tunneling capacity at tunneling server 116 by consolidating multiple tunnels that are used by the same application/UE. In one embodiment, whenever the number of available tunnels at tunneling server 116 falls below a pre-configured threshold, tunneling server 116 identifies UEs that are utilizing multiple tunnels, and requests that some or all of those UEs consolidate their corresponding tunnels into a single target tunnel. Once the tunnels of a UE are consolidated into a target tunnel, tunneling server 116 routes all packets of that UE through the target tunnel.

One embodiment selects a tunnel as a target tunnel among the multiple tunnels utilized by the same UE, and requests that the UE consolidates all its tunnels in that target tunnel. In one embodiment, tunneling server 116 dynamically selects the target tunnel as the tunnel with the best transport protocol (e.g., a datagram-based protocol or a stream-based protocol) to minimize media latency while preserving signaling reliability after tunnel consolidation.

One embodiment provides tunnel consolidation functionality through a first tunnel consolidation module 118 at tunneling client 106 and a second tunnel consolidation module 120 at tunneling server 116. In this embodiment, second tunnel consolidation module 120 keeps track of tunnel resource utilization at tunneling client 116, and may determine that the number of available tunnel resources at tunneling client 116 has fallen below a specific threshold (e.g., the number of additional tunnels that tunneling server 116 can establish with other/new tunneling clients is less than a specific threshold). Then, second tunnel consolidation module 120 may determine that a first TSCF tunnel 108 and a second TSCF tunnel 110 are utilized by the same application (e.g., application 104 is running traffic in multiple tunnels). In one embodiment, first TSCF tunnel 108 and second TSCF tunnel 110 are compliant with TSCF tunnel management (e.g., tunnel initialization, maintenance, termination, etc., as defined by, e.g., 3GPP TR 33.830 V0.5.0), and TSCF tunnel transport protocols are supported for the negotiation of both first TSCF tunnel 108 and second TSCF tunnel 110 between tunneling client 106 and tunneling server 116.

In one embodiment, upon determining that application 104 is utilizing more than one tunnel, second tunnel consolidation module 120 may trigger tunnel consolidation services for application 104. For example, second tunnel consolidation module 120 may indicate to first tunnel consolidation module 118 that second TSCF tunnel 110 needs to be consolidated within first TSCF tunnel 108. Upon receiving the request, first tunnel consolidation module 118 moves the traffic of second TSCF tunnel 110 into first TSCF tunnel 108 and terminates second TSCF tunnel 110. In one embodiment, once tunneling client 106 has its tunnels consolidated, it keeps them consolidated until the consolidated tunnel is terminated.

In one embodiment, in order to support tunnel consolidation services, both tunneling client 106 and tunneling server 116 support multiple internal IP addresses in a single tunnel. In general, each tunnel has an internal IP address associated with it. This IP address is typically the source address of all encapsulated traffic originated at tunneling client 106, and tunneling server 116 associates assigned tunnel IP addresses with specific tunnels and routes packets through the corresponding tunnels. In order to support tunnel consolidation services, tunneling client 106 and tunneling server 116 associate multiple internal IP addresses with a single consolidated tunnel, without application 104 being aware of such association. Accordingly, embodiments provide tunnel consolidation functionality that is transparent to an end user and does not require SDK application programming interface ("API") changes at the end user.

In one embodiment, in order to consolidate second TSCF tunnel 110 into first TSCF tunnel 108, first tunnel consolidation module 118 moves inner media sockets of second TSCF tunnel 110 to first TSCF tunnel 108. A network socket is an endpoint of an inter-process communication flow across a computer network according to a communications protocol. A network socket may be a datagram socket or a stream socket. A datagram socket is a connectionless network socket. Each packet sent or received on a datagram socket is individually addressed and routed. A stream socket provides a connection-oriented and sequenced with mechanisms for creating and destroying connections and for detecting errors. In general, for regular communications, a user can create a datagram or stream socket that uses the network interface of the system in which the application runs. In a TSCF environment, however, sockets use a tunnel for transport instead of a network interface. To differentiate these sockets from regular sockets, they are referred to as "inner sockets" since they only exist inside a tunnel.

In one embodiment, since an inner socket only exists in association with a tunnel and socket traffic gets transported by the tunnel, in order to change the transport (or tunnel type) of an inner socket, it is "moved," meaning that all references to the socket (e.g., references already created/configured by application 104) are removed from the source tunnel and added to the destination tunnel. The socket is neither destroyed nor reconfigured, but its reference (i.e., pointer) is moved from the source tunnel to the destination tunnel. This functionality is transparent to the end user (e.g., application 104) that keeps using the socket without being aware of it being moved.

In one embodiment, in order to determine if any application is using more than one tunnel to communicate with tunneling server 116, second tunnel consolidation module 120 examines outer IP addresses of all tunnels supported by tunneling server 116. The outer IP address of a tunnel is the source IP address as indicated by the outer IP header of the tunnel. For example, when application 104 establishes first TSCF tunnel 108 and second TSCF tunnel 110 with tunneling server 116, these tunnels have the same outer IP address identifying UE 102, but have different internal IP addresses differentiating them at application 104. When second tunnel consolidation module 120 determines that multiple tunnels at tunneling server 116 have the same outer IP address, it identifies that these tunnels are associated with the same device and therefore can be consolidated.

In one embodiment, when second tunnel consolidation module 120 determines that multiple tunnels correspond to the same device and therefore can be consolidated, it chooses one of these tunnels as a target tunnel into which the other tunnels are to be consolidated. In one embodiment, second tunnel consolidation module 120 chooses the target tunnel to be the earliest created tunnel among multiple tunnels corresponding to the same device. In an alternative embodiment, second tunnel consolidation module 120 chooses the target tunnel to be the tunnel that has the most number of sockets compared to other tunnels within multiple tunnels that correspond to the same device.

In another embodiment, second tunnel consolidation module 120 chooses the target tunnel based on its transport protocol as compared to the other tunnels within multiple tunnels that correspond to the same device. For example, if network or tunnel conditions are such that a stream-based tunnel cannot provide sufficient call quality for communicating media traffic (e.g., if a stream-based tunnel results in intolerable latency in communicating media traffic), second tunnel consolidation module 120 chooses the target tunnel to be a datagram-based tunnel and dynamically implements redundancy functionality in the datagram-based tunnel to meet reliability requirements of signaling traffic. In one embodiment, redundancy functionality is implemented in the datagram-based tunnel as described, for example, in U.S. patent application publication 2013/0283037, the contents of which is hereby incorporated by reference.

In one embodiment, second tunnel consolidation module 120 chooses the target tunnel to be a stream-based tunnel if no socket is flagged as RTC. Generally, media sockets are typically marked as RTC when they are created. Accordingly, second tunnel consolidation module 120 may determine that no socket is flagged as RTC, and then if a stream-based tunnel is available, choose that tunnel as the target tunnel and try to consolidate all tunnels into that stream-based tunnel.

Figure 3:
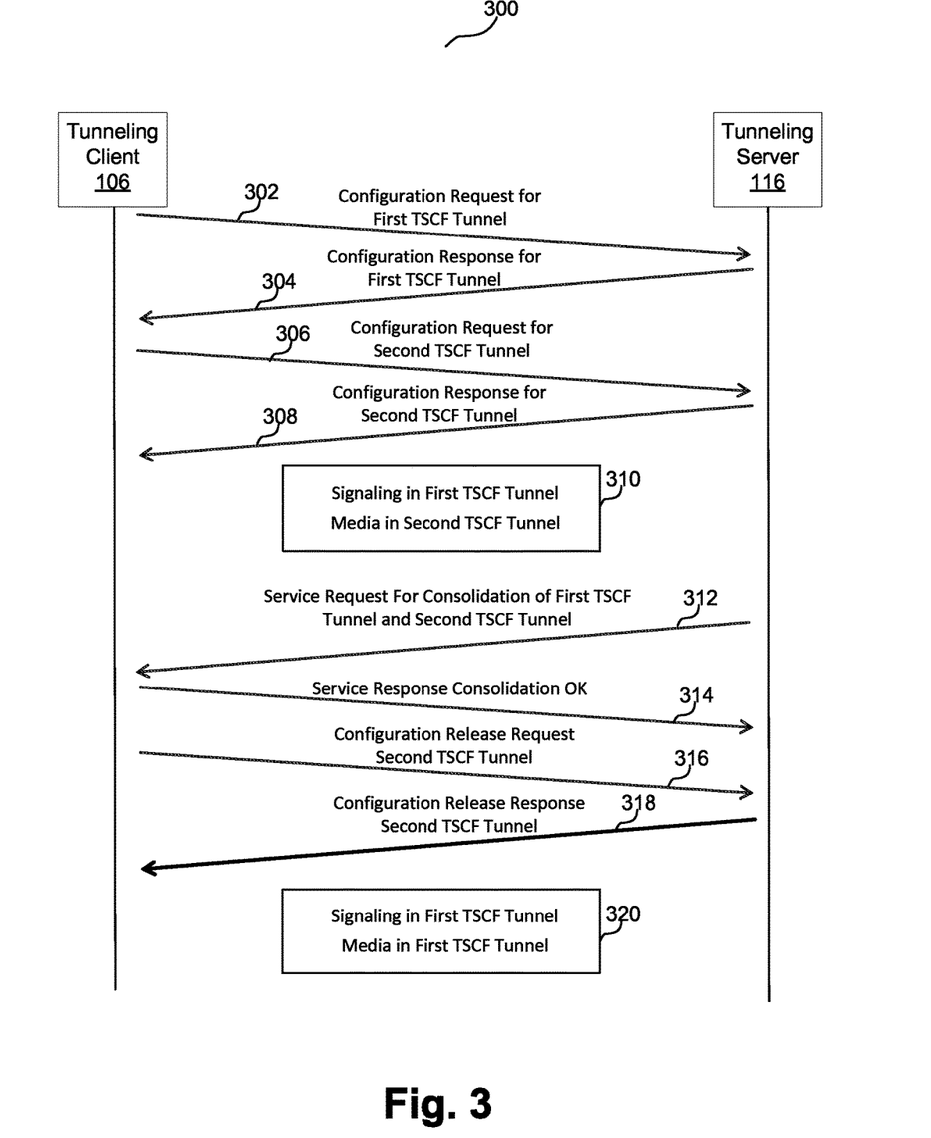
FIG. 3 is a message sequence diagram in accordance with embodiments of the present invention.

FIG. 3 is an example message sequence diagram 300 including the sequence of TSCF control messages exchanged between tunneling client 106 and tunneling server 116 for providing tunnel consolidation services, according to some present embodiments. FIG. 3 includes network elements such as tunneling client 106 and tunneling server 116, as described herein with reference to FIG. 1.

At 302 tunneling client 106 sends a configuration request message to tunneling server 116 to establish first TSCF tunnel 108, and at 304 tunneling server 116 responds to the configuration request message of tunneling client 106 with a configuration response message. Configuration request and response messages allow for tunneling client 106 to obtain configuration information for first TSCF tunnel 108 from tunneling server 116, as described in, for example, 3GPP TR 33.830 V0.5.0. In one embodiment, from the RTC application perspective, application 104 at UE 102 creates first TSCF tunnel 108 by executing a "tsc_ctrl_new_tunnel" API, and the configuration request message is sent in response to the execution of this API.

At 306 tunneling client 106 sends a configuration request message to tunneling server 116 to establish second TSCF tunnel 110, and at 308 tunneling server 116 responds to the configuration request message of tunneling client 106 with a configuration response message. In one embodiment, from the RTC application perspective, application 104 at UE 102 creates second TSCF tunnel 110 by executing a "tsc_ctrl_new_tunnel" API, and the configuration request message is sent in response to the execution of this API.

Upon completing the exchange of configuration request/response messages, at 310 tunneling client 106 and tunneling server 116 use first TSCF tunnel 108 and second TSCF tunnel 110 for performing RTC. In one embodiment, tunneling client 106 and tunneling server 116 use first TSCF tunnel 108 for communicating signaling traffic and use second TSCF tunnel 110 for communicating media traffic. In one embodiment, when an inner socket is needed (e.g., for communicating SIP call control traffic or RTP media traffic), application 104 creates this socket on a respective one of first TSCF tunnel 108 or second TSCF tunnel 110 by executing a "tsc_socket" API. A socket is created by determining a socket type (e.g., datagram vs. stream) and a tunnel on which the socket should be created.

At 312 second tunnel consolidation module 120 at tunneling server 116 determines that tunnel consumption at tunneling server 116 is above a specific pre-configured threshold, and initiates tunnel consolidation on all endpoints that are utilizing more than one tunnel. For example, in order to initiate tunnel consolidation at tunneling client 106 that is utilizing two TSCF tunnels (i.e., first TSCF tunnel 108 and second TSCF tunnel 110), second tunnel consolidation module 120 sends a TSCF service request message to tunneling client 106 to request that second TSCF tunnel 110 be consolidated into first TSCF tunnel 108.

At 314 first tunnel consolidation module 118 at tunneling client 106 receives this service request message and consolidates second TSCF tunnel 110 into first TSCF tunnel 108 by moving the traffic of second TSCF tunnel 110 into first TSCF tunnel 108, and answers back to second tunnel consolidation module 120 to confirm the consolidation.

Upon consolidating second TSCF tunnel 110 into first TSCF tunnel 108, at 316 tunneling client 106 removes/terminates second TSCF tunnel 110 by sending a TSCF configuration release request message to tunneling server 116, and at 318 tunneling server 116 responds to this request by sending a corresponding TSCF configuration release response message to tunneling client 106.

Thereafter, at 320 all traffic corresponding to application 104, including signaling and media traffic, is communicated between tunneling client 106 and tunneling 116 through first TSCF tunnel 108.

In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in second TSCF tunnel 110, there is a binding at tunneling server 116 that links the internal IP address of second TSCF tunnel 110 to that socket. When the socket is moved to first TSCF tunnel 108, that binding has to be removed and then recreated between the socket and the internal IP address of first TSCF tunnel 108. This binding is needed to route traffic back from the untunneled side of an RTC (e.g., service provider network 122) to the tunneled side of an RTC (e.g., UE 102).

One embodiment provides tunnel consolidation services by implementing a TSCF client service request message of type "Service_Type" with a TLV value of "Consolidate_Tunnels". In one embodiment, tunneling server 116 initiates tunnel consolidation by sending this TLV to tunneling client 106 along with a list of all the tunnels to be consolidated. In one embodiment, tunneling server 116 includes the list of all the tunnels to be consolidated by adding their corresponding "Tunnel_Id" TLVs. In one embodiment, the first tunnel in the list is the target tunnel into which all other tunnels are to be consolidated. In one embodiment, tunneling client 106 responds to this request with a TSCF client service response message of the same type. The response message may be a "tsc_response_success" message indicating that tunnel consolidation is possible at UE 102, or may be an error code "tsc_response_error" indicating that tunnel consolidation is not possible at UE 102. Table 4 below provides example TSCF TLVs for providing tunnel consolidation services, according to some embodiments.

TABLE 4

| TLV TYPE | | | SHORT/ LONG | VALUE | | |
|---|---|---|---|---|---|---|
| NAME | VALUE | SEMANTICS | FORMAT | TYPE | LENGTH | NOTES |
| Tunnel_Id | 29 | Tunnel Id | Short | 64-bit | 8 bytes | |
| Service_Type | 27 | Service Type | Short | Unsigned integer | 1 byte | Consolidate_Tunnels = 10 |

Example TSCF TLVs for Providing Tunnel Consolidation Services

One embodiment provides a configuration object "tscf-interface" that includes a parameter "tunnel-consolidation" indicating the threshold value above which second tunnel consolidation module 120 triggers tunnel consolidation functionality. In one embodiment, the possible values for this threshold are, for example, 0-99, with 0 indicating that tunnel consolidation functionality is disabled. In one embodiment, if 1000 tunnels are supported by an interface (e.g., at tunneling server 116) and 90% is indicated as the tunnel consolidation threshold, tunnel consolidation functionality is triggered whenever tunnel 900 is to be created. The following functionality provides a command line interface ("CLI") to configure this threshold, according to one embodiment:

```
SD# configure terminal
SD(configure)# security tscf tscf-interface
SD(tscf-interface)# sel
SD(tscf-interface)# tunnel-consolidation 90
SD(tscf-port)#
```

Table 5 below provides an example TSCF configuration object for providing tunnel consolidation services, according to one embodiment.

TABLE 5

| Parameter Name | Extensible markup language ("XML") tag | Data Type and Default | Value Ranges/ Possible Values | Required or Optional (for feature to work)? |
|---|---|---|---|---|
| tunnel-con-solidation | tunnelCon-solidation | 0-99 | 0 (disabled 1-99 (percentage threshold) | Required to indicate tunnel consolidation |

An Example TSCF Configuration Object for Providing Tunnel Consolidation Services The following functionality provides an example address-pool configuration for providing tunnel consolidation services, according to one embodiment:

```
tscf-interface
    realm-id             access
    state                enabled
    max-tunnels          100
    tunnel-consolidation 90
    local-address-pools  Ip-1
    assigned-services    SIP
tscf-port
    address              192.168.100.100
    port                 4567
    transport-protocol   CDP
    tls-profile
    rekey-profile
```

The following is an example XML functionality for providing tunnel consolidation services, according to one embodiment:

```
<tscfInterface realmID='access'
    state='enabled'
    maxTunnels='100'
    tunnelConsolidation='90'
    assignedServices='SIP'
    options=''
    objectId='33'>
    <key>access</key>
    <localAddressPool name='lp-1'/>
    <tscfPort address='192.168.100.100'
        port='4567'
        transProtocol='CDP'
        tlsProfile=''
        rekeyProfile=''
</tscfInterface>
```

Figure 4:
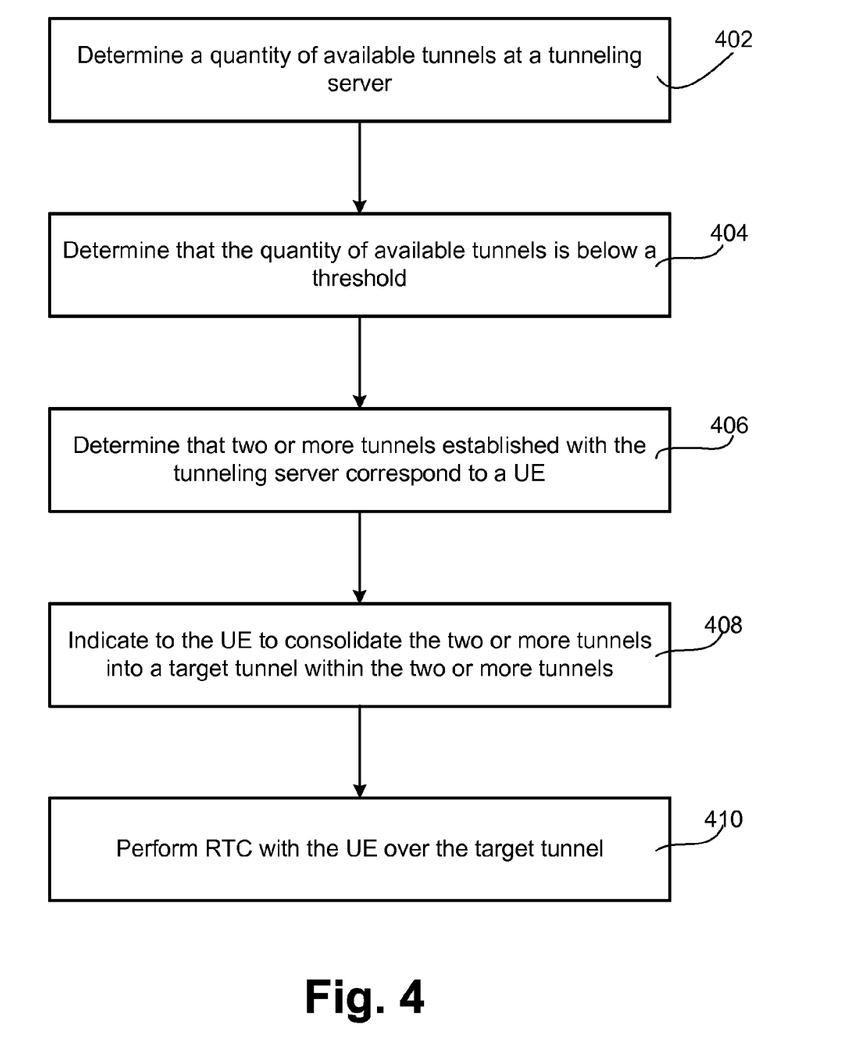
FIG. 4 is a flow diagram of the operation of the tunneling module of FIG. 2 when performing tunneling in accordance with embodiments of the present invention.

FIG. 4 is a flow diagram of tunneling module 16 of FIG. 2 and/or tunneling server 116 of FIG. 1 when performing tunnel consolidation in accordance with embodiments of the present invention. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, second tunnel consolidation module 120 at tunneling server 116 determines how many tunnels are available at tunneling server 116.

At 404, second tunnel consolidation module 120 determines that the quantity of available tunnels is below a threshold.

At 406, second tunnel consolidation module 120 determines that two or more tunnels established with tunneling server 116 correspond to application 104 at UE 102 (e.g., first TSCF tunnel 108 and second TSCF tunnel 110). In one embodiment, second tunnel consolidation module 120 determines that the two or more tunnels correspond to the same UE when the two or more tunnels have the same outer IP address.

At 408, second tunnel consolidation module 120 indicates to UE 102 to consolidate the two or more tunnels into a target tunnel within the two or more tunnels. For example, second tunnel consolidation module 120 indicates to UE 102 to consolidate second TSCF tunnel 110 into first TSCF tunnel 108. In one embodiment, in order to consolidate second TSCF tunnel 110 into first TSCF tunnel 108, first tunnel consolidation module 118 at tunneling client 106 of UE 102 moves sockets of second TSCF tunnel 110 into first TSCF tunnel 108 which is the target tunnel. In one embodiment, tunneling client 106 and tunneling server 116 associate multiple internal IP addresses with the target tunnel, where the multiple internal IP addresses include internal IP addresses of the two or more tunnels.

In one embodiment, in order to indicate to first tunnel consolidation module 118 to consolidate the two or more tunnels into the target tunnel, second tunnel consolidation module 120 sends a TSCF service request message to first tunnel consolidation module 118. Then, first tunnel consolidation module 118 responds to the TSCF service request message of second tunnel consolidation module 120 with a corresponding TSCF service response message indicating consolidation of the two or more tunnels into the target tunnel. Upon consolidating the two or more tunnels into the target tunnel, first tunnel consolidation module 118 terminates all of the two or more tunnels except for the target tunnel.

At 410, tunneling servers performs RTC with UE 102 over the target tunnel, i.e., first TSCF tunnel 108. In one embodiment, second tunnel consolidation module 120 selects the target tunnel to be a datagram-based tunnel that meets quality of service ("QoS") requirements of media traffic of application 104, and tunneling server 116 implements redundancy functionality at the datagram-based tunnel to meet reliability requirements of signaling traffic of application 104. In alternative embodiments, second tunnel consolidation module 120 selects the target tunnel to be an earliest established tunnel among the two or more tunnels or a tunnel among the two or more tunnels that has a most number of sockets.

As disclosed, embodiments allow for a TSCF tunneling configuration that provides tunnel consolidation functionality. Embodiments allow a tunneling server to request tunnel consolidation on demand whenever its tunneling capacity falls below a specific threshold. In one embodiment, tunneling capacity of a tunneling server is increased by consolidating all tunnels that belong to the same endpoint. Accordingly, embodiments give the end user the possibility of utilizing a tunneling server in an efficient way so that RTC services can be provided to more users.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform tunneling for real-time communications (RTC), the tunneling comprising:
   determining a quantity of available tunnels at a tunneling server, the available tunnels are configured according to a tunneled services control function (TSCF) protocol for RTC;
   determining that the quantity of available tunnels is below a threshold that defines a pre-configured number of available tunnels at the tunneling server;
   determining, based on the determination that the quantity of available tunnels is below the threshold, that two or more tunnels established with the tunneling server correspond to a user equipment (UE), wherein at least one of the established tunnels comprises a tunnel configured with a stream-based protocol or a tunnel configured with a datagram-based protocol;
   indicating, when the quantity of available tunnels is below the threshold, to the UE to consolidate the two or more tunnels into a target tunnel within the two or more tunnels wherein, in order to indicate to the UE to consolidate the two or more tunnels into the target tunnel, the tunneling server sends a TSCF service request message to the UE; and
   performing the RTC with the UE over the target tunnel.

2. The non-transitory computer readable medium of claim 1,
   wherein, in order to consolidate the two or more tunnels, the UE moves sockets of the two or more tunnels into the target tunnel;
   wherein the UE and the tunneling server associate multiple internal IP addresses with the target tunnel; and
   wherein the multiple internal IP addresses include internal IP addresses of the two or more tunnels.

3. The non-transitory computer readable medium of claim 1,
   wherein the tunneling server determines that the two or more tunnels correspond to a same UE when the two or more tunnels have a same outer IP address.

4. The non-transitory computer readable medium of claim 1,
   wherein the UE responds to the TSCF service request message of the tunneling server with a corresponding TSCF service response message indicating consolidation of the two or more tunnels into the target tunnel; and
   wherein, upon consolidating the two or more tunnels into the target tunnel, the UE terminates all of the two or more tunnels except for the target tunnel.

5. The non-transitory computer readable medium of claim 1,
   wherein the tunneling server selects the target tunnel to be a datagram-based tunnel that meets quality of service (QoS) requirements of media traffic of the UE; and
   wherein the tunneling server implements redundancy functionality at the datagram-based tunnel to meet reliability requirements of signaling traffic of the UE.

6. The non-transitory computer readable medium of claim 1,
   wherein the tunneling server selects the target tunnel to be an earliest established tunnel among the two or more tunnels or a tunnel among the two or more tunnels that has a most number of sockets.

7. The non-transitory computer readable medium of claim of claim 1, wherein the tunneling server selects the target tunnel to be a stream-based tunnel.

8. A method of tunneling for real-time communications (RTC), comprising:
   determining a quantity of available tunnels at a tunneling server, the available tunnels are configured according to a tunneled services control function (TSCF) protocol;
   determining that the quantity of available tunnels is below a threshold that defines a pre-configured number of available tunnels at the tunneling server;
   determining, based on the determination that the quantity of available tunnels is below the threshold, that two or more tunnels established with the tunneling server correspond to a user equipment (UE), wherein at least one of the established tunnels comprises a tunnel configured with a stream-based protocol or a tunnel configured with a datagram-based protocol;
   indicating, when the quantity of available tunnels is below the threshold, to the UE to consolidate the two or more tunnels into a target tunnel within the two or more tunnels wherein, in order to indicate to the UE to consolidate the two or more tunnels into the target tunnel, the tunneling server sends a TSCF service request message to the UE; and
   performing the RTC with the UE over the target tunnel.

9. The method of claim 8, wherein the tunneling server selects the target tunnel to be a stream-based tunnel.

10. The method of claim 8,
    wherein, in order to consolidate the two or more tunnels, the UE moves sockets of the two or more tunnels into the target tunnel;
    wherein the UE and the tunneling server associate multiple internal IP addresses with the target tunnel; and
    wherein the multiple internal IP addresses include internal IP addresses of the two or more tunnels.

11. The method of claim 8,
    wherein the tunneling server determines that the two or more tunnels correspond to a same UE when the two or more tunnels have a same outer IP address.

12. The method of claim 8,
    wherein the UE responds to the TSCF service request message of the tunneling server with a corresponding TSCF service response message indicating consolidation of the two or more tunnels into the target tunnel; and
    wherein, upon consolidating the two or more tunnels into the target tunnel, the UE terminates all of the two or more tunnels except for the target tunnel.

13. The method of claim 8,
    wherein the tunneling server selects the target tunnel to be a datagram-based tunnel that meets quality of service (QoS) requirements of media traffic of the UE; and wherein the tunneling server implements redundancy functionality at the datagram-based tunnel to meet reliability requirements of signaling traffic of the UE.

14. The method of claim 8,
wherein the tunneling server selects the target tunnel to be an earliest established tunnel among the two or more tunnels or a tunnel among the two or more tunnels that has a most number of sockets.

15. A system for tunneling of real-time communications (RTC), comprising:
a processor; and
a memory storing one or more programs for execution by the processor, the one or more programs including instructions for:
determining a quantity of available tunnels at a tunneling server, the available tunnels are configured according to a tunneled services control function (TSCF) protocol;
determining that the quantity of available tunnels is below a threshold that defines a pre-configured number of available tunnels at the tunneling server;
determining, based on the determination that the quantity of available tunnels is below the threshold, that two or more tunnels established with the tunneling server correspond to a user equipment (UE), wherein at least one of the established tunnels comprises a tunnel configured with a stream-based protocol or a tunnel configured with a datagram-based protocol;
indicating, when the quantity of available tunnels is below the threshold, to the UE to consolidate the two or more tunnels into a target tunnel within the two or more tunnels wherein, in order to indicate to the UE to consolidate the two or more tunnels into the target tunnel, the tunneling server sends a TSCF service request message to the UE; and
performing the RTC with the UE over the target tunnel.

16. The system of claim 15,
wherein, in order to consolidate the two or more tunnels, the UE moves sockets of the two or more tunnels into the target tunnel;
wherein the UE and the tunneling server associate multiple internal IP addresses with the target tunnel; and
wherein the multiple internal IP addresses include internal IP addresses of the two or more tunnels.

17. The system of claim 15,
wherein the tunneling server determines that the two or more tunnels correspond to a same UE when the two or more tunnels have a same outer IP address.

18. The system of claim 15,
wherein the UE responds to the TSCF service request message of the tunneling server with a corresponding TSCF service response message indicating consolidation of the two or more tunnels into the target tunnel; and
wherein, upon consolidating the two or more tunnels into the target tunnel, the UE terminates all of the two or more tunnels except for the target tunnel.

19. The system of claim 15,
wherein the tunneling server selects the target tunnel to be a datagram-based tunnel that meets quality of service (QoS) requirements of media traffic of the UE; and
wherein the tunneling server implements redundancy functionality at the datagram-based tunnel to meet reliability requirements of signaling traffic of the UE.

20. The system of claim 15,
wherein each tunnel comprises a plurality of inner sockets.

* * * * *

UNITED STATES PATENT AND TRADEMARK OFFICE
CERTIFICATE OF CORRECTION

PATENT NO. : 10,263,913 B2
APPLICATION NO. : 14/681418
DATED : April 16, 2019
INVENTOR(S) : Herrero Page 1 of 1

It is certified that error appears in the above-identified patent and that said Letters Patent is hereby corrected as shown below:

In the Claims

In Column 14, Line 15, delete "medium of claim" and insert -- medium --, therefor.

Signed and Sealed this
Third Day of November, 2020

Andrei Iancu
*Director of the United States Patent and Trademark Office*